Feb. 9, 1971 D. P. HYNES ET AL 3,562,719

ADDRESS TRANSLATOR

Filed May 23, 1969 5 Sheets-Sheet 1

INVENTORS.
DONALD P. HYNES
DONALD W. DOHLMAN

BY

Christie, Parker & Hale
ATTORNEYS

United States Patent Office 3,562,719

Patented Feb. 9, 1971

3,562,719

ADDRESS TRANSLATOR

Donald P. Hynes, West Covina, and Donald W. Pohlman, Glendora, Calif., assignors to Burroughs Corporation, Detroit, Mich., a corporation of Michigan Filed May 23, 1969, Ser. No. 827,332
Int. Cl. G06f 7/22
U.S. Cl. 340—172.5 14 Claims

ABSTRACT OF THE DISCLOSURE

A translator of addresses for a rotating record member file. A parameter circuit is provided for each different information format for which addresses are to be translated. Each parameter circuit forms coded parameter signals for the corresponding format. At least one parameter signal is formed for each address part in the translated address. A circuit forms the complement of the parameter signals. An adder receives the address to be translated and combines the address with the parameter signals or the complement of the parameter signals, thereby forming a coded result signal. The adder also combines the results formed thereby with the parameter signals or the complement of the parameter signals. A counter is provided for each of a plurality of the address parts and counts the number of times the corresponding parameter complement is combined with the address or the result signals before the coded result signals become less than zero. The state of the counters and the result after all parameter signals have been combined, represent the transducer selection and angular position parts of the translated address.

BACKGROUND OF THE INVENTION

Field of the invention

This invention relates to cyclical storage devices and, more particularly, to an address translator for conversion of signals in one code to signals in another code for control of reading and writing in cyclical storage devices.

Description of the prior art

Cyclical storage apparatus are commonly used for storing digital information. Common types of cyclical storage devices are discs and drums. Disc file storage systems are commonly known which have a plurality of storage units, each storage unit contains one or more discs (which may or may not be connected to a common drive), each of which has a disc face containing a magnetic recording surface. The information recorded on the disc faces are organized in a number of different ways. By way of example, discs have been organized into tracks, segments and zones. Each zone is a radial area on a disc that has a plurality of separate recording tracks. Each track has a plurality of angular segments. A unit of information is generally stored in each angular segment. A read/write head may be provided for each track on each disc surface or may contain a group of movable heads capable of reading the various tracks on the disc face.

Many times it is desirable to provide a composite binary coded address uniquely defining a particular segment in which reading or writing is to take place. However, in systems having a plurality of storage units each containing a plurality of disc faces, each containing a plurality of zones of tracks, each track containing a plurality of segments, it is necessary to separately identify each of these parameters. The part identifying the storage unit, disc face, zone and track is used to select the proper read/write head and the part identifying the segment is used to select the proper angular position of the disc at which reading or writing is to take place.

One address translator utilizes a matrix decoder unit which receives a coded address designating a location to be accessed and converts the address to separate transducer selection and angular position selection signals for controlling the respective selection circuits. This device has the disadvantage that it does not allow flexibility in format or organization of the segments on the cyclical storage device to take care of maximum storage capacity. Storage capacity should be limited only by the recording capacity of the device, and not the decoding arrangement. The aforementioned prior art device is limited by the matrix decoding.

An improved address translator utilizes an arithmetic device for translating and this allows maximum utilization of the recording capability. The present invention is an improvement over the address translator using the arithmetic unit in providing more flexibility.

SUMMARY OF THE INVENTION

The present invention is directed to an address translator which is flexible and, for example, can accommodate changes in the number of storage units, changes in the number of disc faces per storage unit and changes in the number of tracks within any one segment. The present invention is a distinct improvement over the aforementioned address translator because of the foregoing features.

Briefly, an embodiment of the present invention is a translator of addresses for a rotating record member file, predetermined information formats being assigned for various record members and transducers being used for reading and writing thereon, the translator converting the addresses into a plurality of address parts for transducer selection and for angular position selection of the member. A parameter circuit means is provided for each different information format for which the addresses are to be translated, each parameter circuit means forming coded parameter signals for the corresponding format. At least one parameter signal is formed for each address part. Means is provided for forming the complement of said parameter signals. A combining means receives an address to be translated and combines the same with said parameter signals or said complement of said parameter signals thereby forming a coded result signal, thereby causing addition or subtraction, respectively, of the parameter signals. The combining means further combines any results formed thereby with said parameter signals or said complement of parameter signals. Means is provided for counting the number of times a parameter complement signal corresponding to a particular address part is combined with the address or result signals before the coded result signals become less than zero. Means including said counting means forms a signal representing the transducer selection and the angular position parts of the translated address.

DESCRIPTION OF THE PREFERRED EMBODIMENT

Figure 4:
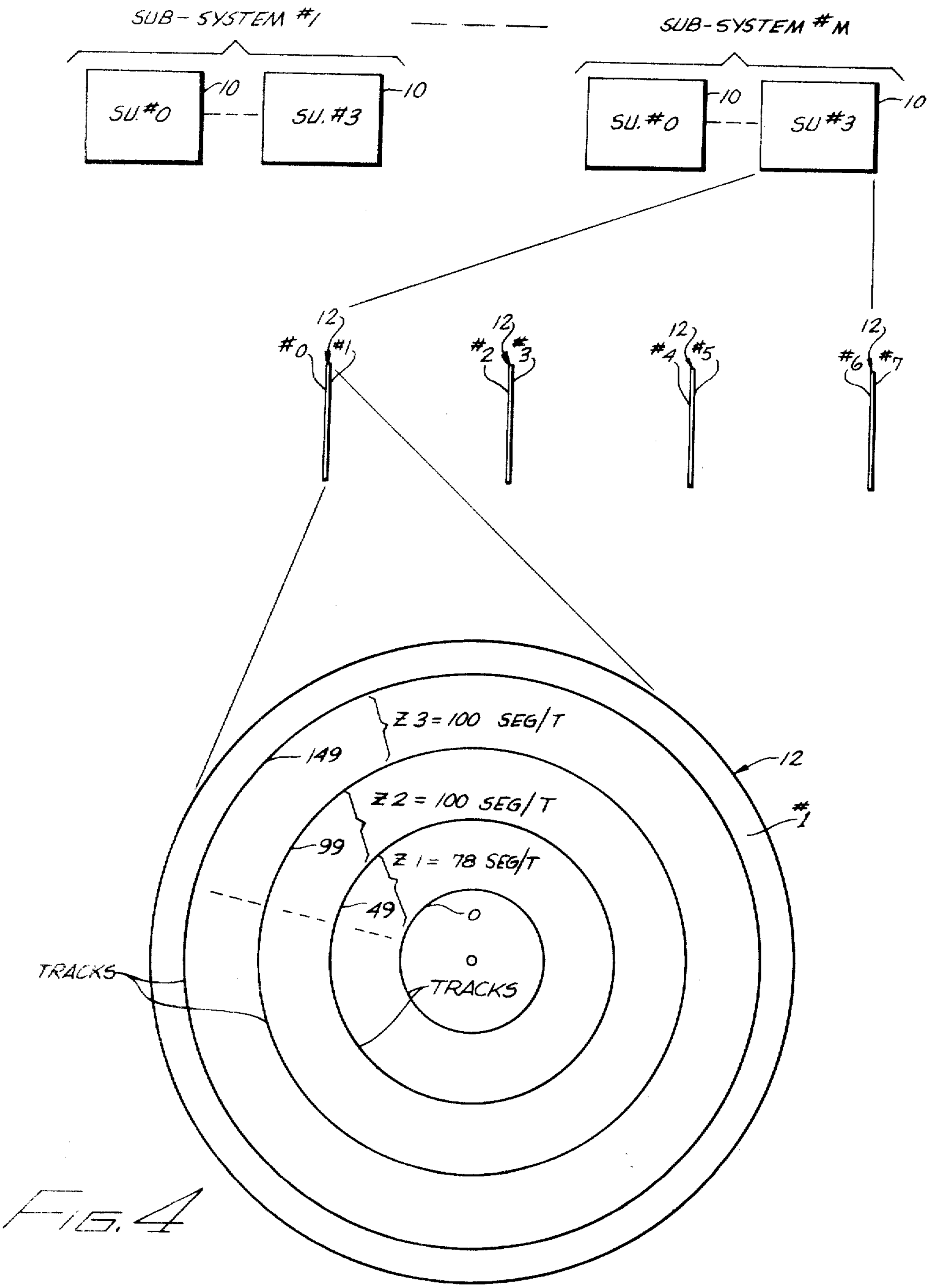
FIG. 4 is a sketch illustrating the organization of a disc file system for use with the address translator of FIG. 1.

Before describing the address translator in detail, refer to FIG. 4 which shows a sketch of a disc file system for use with the address translator #1 through #M subsystems are shown. Four storage units 10 (#0–#3) are provided in each subsystem. Within each storage unit are four rotating discs 12 illutrated in the middle of FIG. 4. Each disc 12 has two sides, each of which is covered by a thin magnetic recording film on which information is read and recorded magnetically. For purposes of illustration, the disc surfaces are numbered 0 through 7, disc surfaces #0 and #1 being on one disc, disc surfaces #2 and #3 being on another disc, etc. At the bottom of FIG. 4 the format of information for disc surface #1 is shown by way of illustration. Disc surface #1 has one hundred and fifty tracks in which information is magnetically recorded. The tracks are numbered 0 through 149. The tracks are arranged into three groups called zones, represented by the symbols Z1, Z2 and Z3. Each zone contains fifty tracks, #0 through #49 being zone Z1, tracks #50 through #99 being zone Z2, and tracks #100 through #149 being zone Z3. Each track is divided up into a number of different segments, each of which stores a unit of information. In zone Z1 each track contains seventy-eight segments per track. In zones Z2 and Z3 each track contains one hundred segments. Thus, there is a total of 13,900 segments per disc face and 111,200 segments per storage unit.

Figure 1:
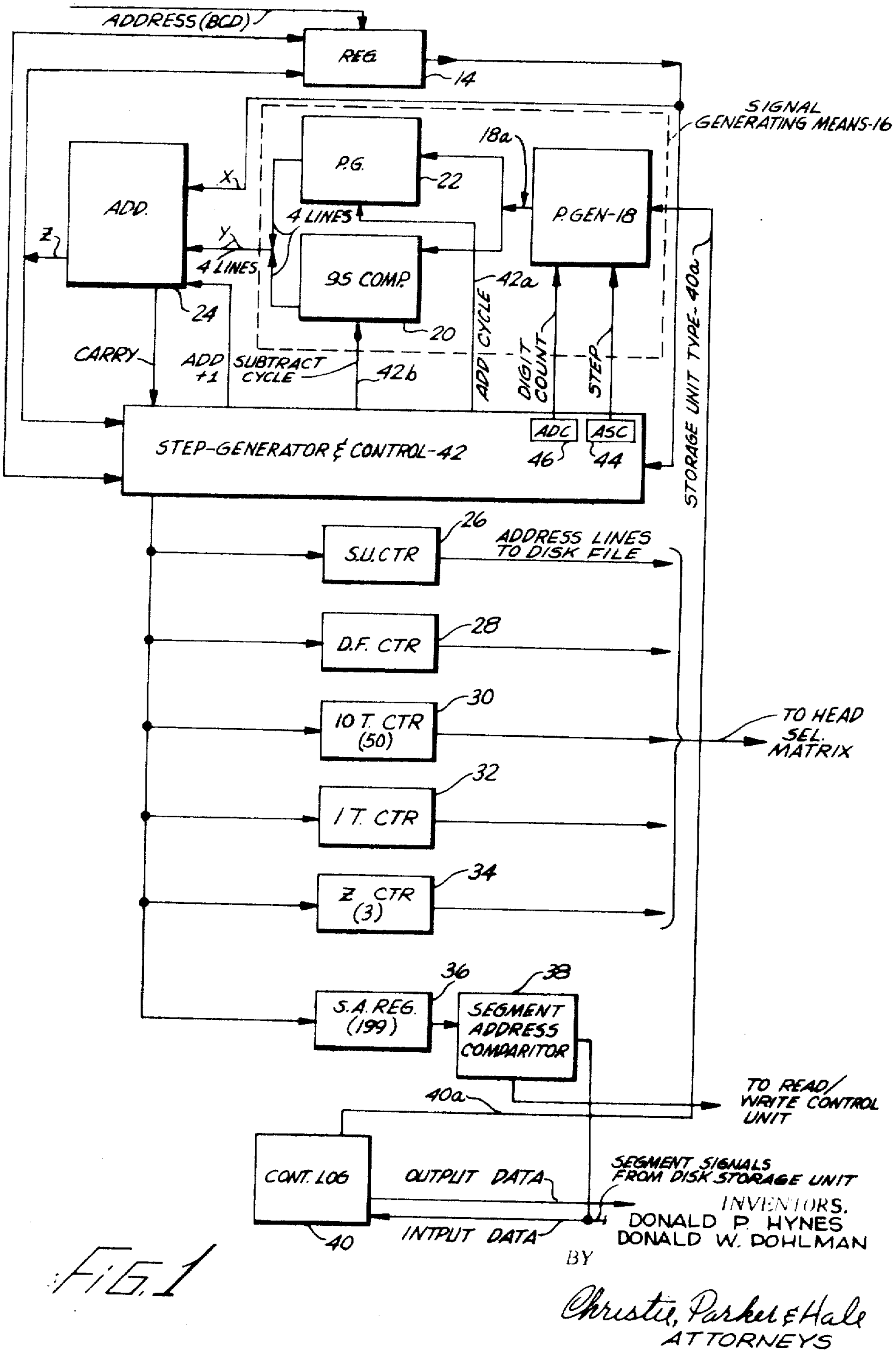
FIG. 1 is a block diagram of an address translator and embodying the present invention.

Refer now to the address translator shown in FIG. 1. For purposes of explanation, the address translator is arranged to receive and translate or decode binary coded decimal addresses. It should be understood that the invention is not limited to the conversion of binary coded decimal signals as signals coded in other number base systems may be used with appropriate modifications of the circuit disclosed herein. The binary coded addresses are translated into signals identifying a storage unit, a disc face, a track, a zone, and a segment.

The binary coded addresses are received and stored in a register 14. The system functions to translate the address stored in the register 14 by subtracting various parameters related to the desired parts of the translated address and counting the number of times the parameters are subtracted before a negative result is obtained. Actually, the hardware uses the 9's complement of the subtrahend and adds it to the minuend. A binary 1 digit is added to the least significant digit of the two numbers as they are added together, so that, in effect, the 10's complement of the subtrahend is added to the minuend. Therefore, a carryout signal is obtained whenever the addition results in a positive number but produces no carryout when a negative result is obtained. An overflow is said to be obtained when a negative result is obtained and there is no carryout.

To this end, a signal generating means 16 is provided for producing signals representative of either the parameter or the complement of the parameter,. The signal generating means 16 is able to produce the parameter or the complement thereof corresponding to each of the translated address parts.

An adder 24 is provided for combining or adding the coded signals from the signal generating means 16 with the content of the register 14. The result, which is the output signal from the adder 24, is stored back into the register 14.

A counter is provided for each of the parameters generated by the signal generating means 16. The counters are a storage unit counter 26, a disc face counter 28, track counters 30 and 32, a zone counter 34 corresponding to the various parts of the translated address identified by the name. Each counter counts the number of times the corresponding parameter complement is added by the adder 24 without producing a result of less than zero, (i.e. before producing a result without a carry). The resultant states of the counters thereby represent the address parts for control of the read/write head selection.

A segment address register 36 is provided for storing the result left after all the counters 26 through 34 have been set. This result stored in the register 36 identifies the particular segment within a track, at which reading or writing is to take place. A segment address comparator 38 is provided for comparing the segment address signals from the disc storage unit with the segment address contained in the segment address register 36. When an equality is detected by the segment address comparator 38, a control signal is sent back to the read/write control circuits for the designated storage unit causing reading or writing to take place.

Consider now the actual parameters generated by the signal generating means 16. The actual parameters are shown in Table I. The values are shown in decimal form but are actually binary coded decimal numbers and their description is given in abbreviated form. "Segs" represents segments, and "SU" represents storage units.

A step generator and control unit 42 is provided for controlling the signal generating means 16, the counters 26 through 34, and the storage of information from the register 14 into the segment address register 36. An address sequence counter (ASC) 44 is provided in 42 for applying signals to the program generator 18 designating each parameter to be generated. As a result, the signal generating means 16 generates a parameter corresponding to the state of the ASC 44. The address being converted is a binary coded decimal address and all addition and subtraction is done a digit at a time. Accordingly, the digits of each parameter (or their complement) must be generated a binary coded digit at a time. To this end, an address digit counter (ADC) 46 is provided for designating to the signal generating means 16 which one of the digits of each parameter (or its complement) is to be generated.

The signal generating means 16 includes a parameter generator 18, a parameter gate 22 and a 9's complement gate 20. The parameter generator 18 generates signals corresponding to the parameter designated by the ASC 44, generating the digits one at a time as specified by the states of the ADC 46. The output of the parameter generator 18 is coupled directly to the input of the adder 24 or the 9's complement is generated and applied to the input of the adder 24 depending on the signals on the lines 42*a* and 42*b* from the step-generator and control 42. A signal on the add cycle line 42*a* causes the parameter gate 22 to gate the digits from the parameter generator 12 directly to the adder 24, whereas a signal on the subtract cycle line 42*b* causes the 9's complement circuit 20 to apply the 9's complement of the same digit to the input of the adder 24. The other input to the adder 24 is from the output of the register 14.

Thus, it may be seen that the signal generating means 16 applies the digits of a parameter or the complement thereof to the adder 24, digit by digit. The register 14 is a shift register and applies the digits contained therein one at a time to the input of the adder 24 in synchronism with the digits from the signal generating means 16. The adder 24 combines the digits together producing an output corresponding to the sum. If the 9's complement of the parameter is applied to the adder 24, the parameter is subtracted from the digits shifted out of the register 14. The control 42 applies a control signal to an ADD+1 input line to the adder 24 as the ADC counter 46 points to the least significant digit, and the least significant digits of the two numbers are applied to the adder 24. This causes the adder 24 to add a binary 1 digit to the least significant digits to effect subtraction. If a parameter digit (uncomplemented) is applied to the adder 24 by the signal generating means 16, the sum of the two will be produced by the adder 24.

EXAMPLE OF OPERATION

Table II shows an example (in the decimal number system) of the parameter digits (uncomplemented) formed by the parameter generator 18 for each state of the ASC 44 and the ADC 46 using the parameters shown in Table I.

Figure 3A:
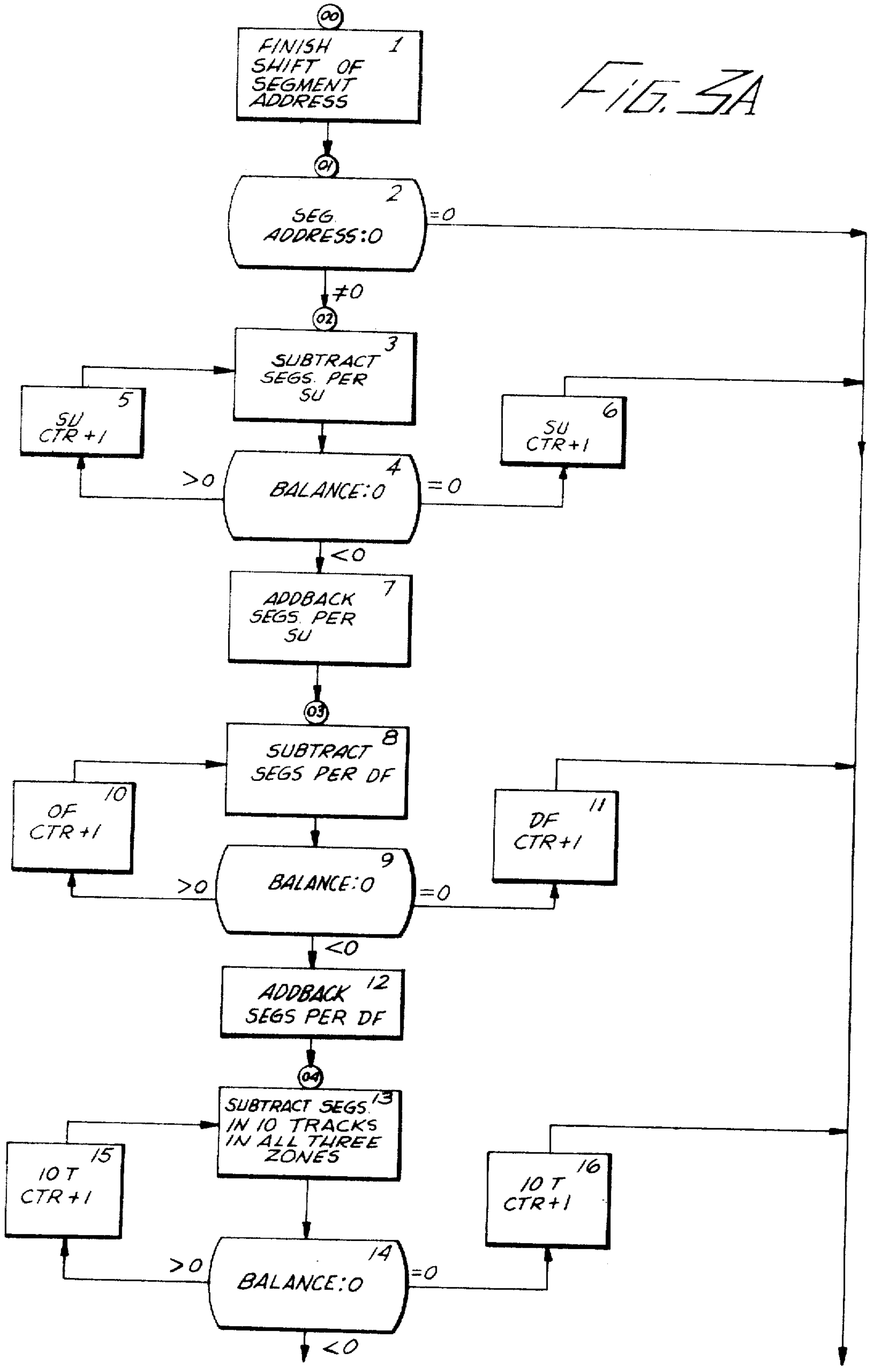
FIGS. 3A–3B are flow diagrams illustrating the sequence of operation of the address translator shown in FIG. 1.
Figure 3B:
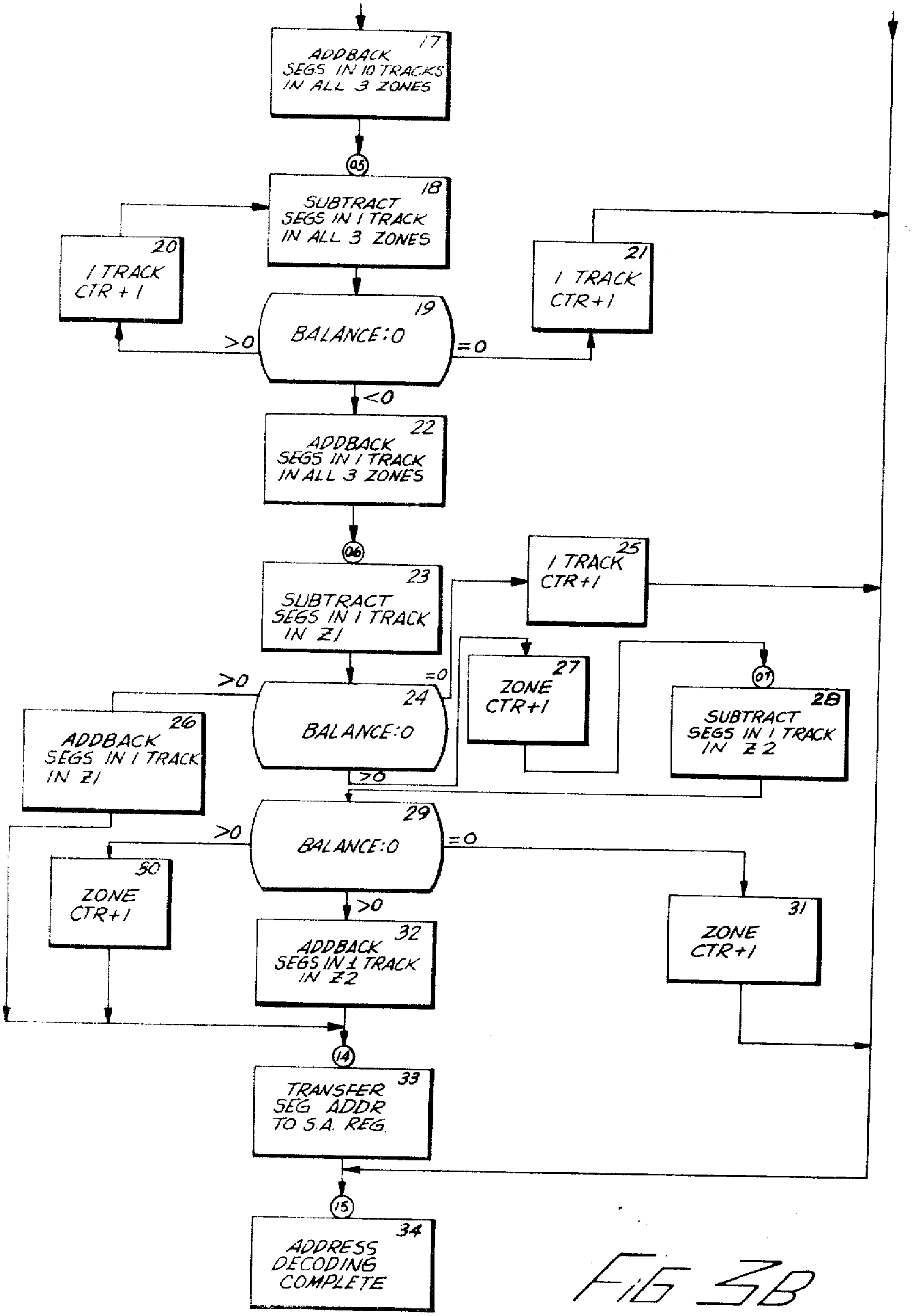

Consider now an actual example of the operation of the address translator shown in FIG. 1 with reference to the flow diagram shown in FIGS. 3A and 3B. The flow diagram of FIGS. 3A and 3B is arranged into blocks #1 through #34 for ease of reference. Words and abbreviations of words are shown within the blocks of FIG. 3 to illustrate the sequence of operation. By way of example, each block in the flow diagram of FIGS. 3A and 3B represents the state of a sequence counter (not shown) commonly used in data processing systems.

Initially, an address to be translated is shifted in to the register 14 by conventional means (not shown). The end of this operation is represented in block 1. The step generator and control 42 then causes the register 14 to shift out the stored address (a digit at a time) applying the digits to the adder 24. Nothing is added to the adder 24 by the signal generating means 16. Accordingly, the digits of the address are applied unaltered to the output of the adder 24. The step generator and control 42 has a monitoring means (not shown) which monitors the output of the adder 24 during this initial shift of the register 14 and if all digits are zero, the control 42 causes the system to go from block 2 to block 34 where the address decoding is complete. In other words, if the address initially stored in the register 14 is zero, the other decoding steps are skipped and the operation is terminated immediately.

Assuming that the control 42 detects that the address is not zero, block 3 is entered. During block 3 the control 42 sets the ASC 44 to state 2 corresponding to the parameter—"segments per storage unit," (see Tables I and II). The parameter is comprised of the binary coded decimal digits 111,200. The control 42 causes the register 14 to shift out the address therein, digit by digit, and causes the ADC 46 to count through a plurality of states, one state corresponding to each digit shifted out of the register 14. This causes the parameter generator 18 to form the digits of the parameter corresponding to each digit shifted out of the register 14. Block 3 requires a subtract operation. Accordingly, the control 42 applies a control signal on the subtract line **42*b*, causing the 9's complement gate 20 to form the 9's complement of each parameter digit formed by the parameter generator 18. The adder 24 automatically adds each digit from the register 14 to the corresponding digit from the signal generating means 16 and forms the result digits at its output. The control 42 applies a control signal on the ADD+1 line as the two least significant digits are added causing a 1 to be added to the least significant digit of the two numbers. It should be understood that ADD+1 line is energized during each subtraction (i.e. blocks 3, 8, 13, 18, 23, 28**) as the least significant digits are added, but this fact will not be repeated during the following description.

Continuing with the operation, the register 14, under control of the control 42, shifts the result digits back into the register 14. After the ADC 46 has counted through all states corresponding to the digits in the address (or parameter), block 4 is entered wherein a branch is made to one of blocks 5, 6 or 7. If a carry signal was formed on the carry line (from the adder 24) due to the addition of the last digit of the address, the result is greater than zero and block 5 is entered where the control 42 causes the SU counter 26 to count up one unit and the block 3 is re-entered. Blocks 3, 4 and 5 are entered time after time and each time the SU counter is counted up one state until the adder 24 does not produce a carry for the last digit of the address (the result is zero), or until the result coming out of the adder 24 is equal to zero.

If the result of any addition in block 3 is zero, the subtraction terminates. To this end, block 6 is entered following block 4 where the SU counter 26 is counted up one and subsequent thereto the control 42 goes to block 34 where again the address decoding is complete. The state of the SU counter 26 identifies the storage unit identified by the original address. If no carryout signal is formed for the last digit of the address during any cycle through block 3, it means that the result formed by the adder 24 (and now stored in the register 14) is less than zero or negative. Accordingly, block 7 is entered where the parameter is added back to the negative result in the register 14. To this end, the control 42 forms a control signal on the add cycle line **42*a*, causing the parameter gate 22 to couple the parameter digit by digit without being complemented to the adder 24 simultaneously with the digits of the negative result in the register 14. As a result, the adder forms a positive result which is shifted back into the register 14**.

Following block 7, block 8 is entered where control 42 sets the ASC 44 into state 3. State 3 of the ASC 44 corresponds to the parameter—"segment per disc face." With reference to the example shown in Table I, the parameter—"segments per disc face" is 13,900. During block 8 the ASC 44 counts through its states causing the digits of the 9's complement of the parameter—"segments per disc face" to be applied to the adder by the generating means 16. As a result, the parameter is subtracted from the remainder now in the register 14. In block 9 the result is checked to see whether it is equal to zero, less than zero or greater than zero similar to the description of blocks 3, 4 and 5. If the result is greater than zero, then the DF counter 28 is counted up by one unit and block 8 is re-entered where the number of segments per disc face is again subtracted from the remainder now contained in the register 14, all as described hereinabove. This process is repeated counting the DF counter 28 up one unit for each cycle through blocks 8, 9 and 10 until the remainder generated by the adder 24 is equal to zero or less than zero.

Assume that during block 8 the remainder is equal to zero. Block 11 is then entered where the DF counter 28 is counted up by one unit and the terminal block 34 is entered where the decoding is complete. At this point the state of the DF counter 28 identifies the disc face in the identified storage unit of the original address.

If the remainder is less than zero during block 8, then block 12 is entered where the signal generating means 16 generates the parameter (as opposed to the complement thereof) and the adder 24 adds the parameter—"segments per disc face" back to the content of the register 14, thereby causing a positive result to be stored back in the register 14. Under these conditions, the state of the DF counter 28 identifies the disc face of the identified storage unit of the original address.

The tracks are identified using two parameters as compared to one for other parts of the translated address. A first parameter—"segments in 10 tracks in all 3 zones" allows a group of ten tracks in all three zones to be identified. The second parameter—"segments in 1 track in all 3 zones" allows a single track in the identified group of ten tracks to be identified.

Following block 12, block 13 is entered and the control 42 sets the ASC 44 into state 4. State 4 of the ASC 44 corresponds to the parameter—"segments in 10 tracks in all 3 zones." With reference to the table in Table I, it will be seen that this parameter is the decimal number 2,780.

The complement of this parameter is applied to the adder 24 and the parameter is subtracted from the content of the register 14. During block 14 the result obtained in the previous block is checked and if it was greater than zero, then block 15 is entered where the 10T. counter 30 is counted up one unit. Blocks 13, 14 and 15 are re-entered repetitively until the result obtained is either equal to zero or less than zero. Similar to blocks 4 and 6, if the result is equal to zero, block 16 is entered where the 10T. counter 30 is counted up one unit and subsequently block 34 is entered where the address decoding is complete. If the result becomes less than zero, then block 17 is entered where the uncomplemented parameter "segments in 10 tracks in all 3 zones" is applied to the adder 24 causing the result contained in the register 14 to be modified back to a positive number. Following either block 17 or block 16, depending on the result, the state of the 10T. counter 30 will identify the group of ten tracks identified in the original address.

Following block 17, block 18 is entered and the ASC 44 is set to state 5 corresponding to the parameter—"segments in 1 track in all 3 zones." Reference to Table I reveals that the parameter is 000,278. The ASC 44 goes through its states causing the parameter generator 18 to form the 9's complement of these digits. Similar to blocks 3, 4 and 5, during blocks 18, 19 and 20 the parameter—"segments in 1 track in all 3 zones" are repeatedly subtracted (adding the 9's complement) from the content of the register 14 and the 1T. counter 32 is counted up by one unit until the result contained in the register 14 is either equal to zero or less than zero. If the result in register 14 becomes equal to zero, then block 21 is entered where the 1T. counter 32 is counted up one unit and then block 34 is entered where the address decoding is complete. The state of the 1T. counter 32 then identifies one track in the identified group of ten tracks where reading and writing is to take place.

If the result becomes less than zero during block 19, block 22 is entered where the parameter—"sigments in 1 track in all 3 zones" (uncomplemented) is added back to the content of the register 14 causing a positive result to be stored therein. Under these conditions the 1T. counter 32 identifies the one track in the identified group of ten tracks.

Following block 22, block 23 is entered and the ASC is set to state 6 corresponding to the parameter—"segments in 1 track in zone 1" to determine the zone. The subsequent operation differs somewhat from that used to set counters 26–32. During block 23 the signal generating means 16 applies the 9's complement of the parameter—"segments in 1 track in zone 1" to the adder 24 causing the parameter to be subtracted from the content of the register 14 and the result is stored back into the register 14. If the result is less than zero, the zone identified in the original address is zone 1. If the result is greater than zero then the zone identified by the original address is either zone 2 or zone 3.

Assuming the result is equal to zero and hence the zone is zone 2, block 25 is entered where the zone counter 34 is counted up one unit and then block 34 is entered where the address decoding is complete. The state of the Z counter 34 then identifies zone 2 as being the zone identified by the original address. However, if in block 24 it is found that the result is less than zero and therefore the desired zone is 1, then block 26 is entered where the parameter—"segments in 1 track zone 1" (uncomplemented) is added back to the content of the register 14 by the adder 24, thereby forming a positive result. The state of the Z counter 34 is unaltered and identifies zone 1 as the zone identified in the original address.

Assuming the result is less than zero and block 26 has been entered, block 33 is subsequently entered. During block 33 the result contained in register 14 is the segment number in the zone, disc face, track, and storage unit presently identified by the state of the counters 34, 32, 30, 28 and 26. Accordingly, during block 33 the content of the register 14 is shifted out through the adder 24 (unaltered) and the control 42 transfers the digits from the register 14 into the segment address register 36 where they are stored. Thus, following block 33 the S.A. register 36 contains the segment number. At the appropriate time the segment address comparator 38 compares the segment number contained in the S.A. register 36 with the segment signals coming from the disc storage unit to determine the precise time when reading and writing is to take place in the selected track of the selected disc face of the selected storage unit, all identified by the state of the counters 26–34.

Return now to block 24 and assume that the result obtained by subtracting the parameter—"segments in 1 track in zone 1" caused a zero result in the register 14. If the result is zero it means that the desired sequent is segment 0 and the zone is zone 2. Accordingly, block 25 is then entered where the state of the Z counter 34 is counted up one more unit identifying zone 2. Following block 25, block 34 is entered where the address decoding is complete as described above.

Returning again to block 24, assume that the result is greater than zero. This indicates that the desired zone is either zone 2 or zone 3. Accordingly, block 27 is entered where the zone counter 34 is counted up by one unit and thereby identifies zone 2. Following block 27, block 28 is entered where the ASC 44 is set to state 7 causing the parameter—"segments in 1 track in zone 2" to be selected in the signal generating means 16. During block 28 the signal generating means 16 forms the complement of the parameter and the adder 24 combines the parameter complement with the content of the register 14 causing the result to be stored back into register 14.

During block 29 the result obtained during block 28 is again checked to see whether the result is equal to zero, greater than zero, or less than zero. If the result is equal to zero, it means that the desired segment is segment 0, and that is lies in zone 3. Accordingly, block 31 is entered where the zone counter 34 is counted up to a state corresponding to zone 3 and subsequently block 34 is entered where decoding is complete.

Assume that during block 29 it is found that the result of the previous subtraction (now in register 14) is greater than zero. This means that the desired zone is zone 3, accordingly, block 30 is entered where the zone counter 34 is counted up by one unit. At this time the content of the register 14 is the number of the desired segment. Accordingly, after block 30, block 33 is entered where the content of the register 14 is shifted out through the adder 24 and the control 42 transfers the digits of the result into the S.A. register 36 for subsequent use in selecting the proper angular position on the disc.

Return now to block 29 and assume that the result is less than zero. This means that the result lies somewhere in zone 2. Accordingly, block 32 is entered and the signal generating means 16 applies the parameter—"segments in 1 track in zone 2" (uncomplemented) to the adder 24 causing this parameter to be added back to the content of the register 14 forming a positive result. The register 14 now contains the segment number, accordingly, state 33 is entered where the content of the register 14 is shifted out through the adder 24 and the control 42 transfers the segment number to the S.A. register 36 for use in selecting the proper angular position of the disc as described hereinabove. Following block 33, block 34 is entered where the address decoding is complete and the arrival of another address to be decoded is awaited.

Figure 2:
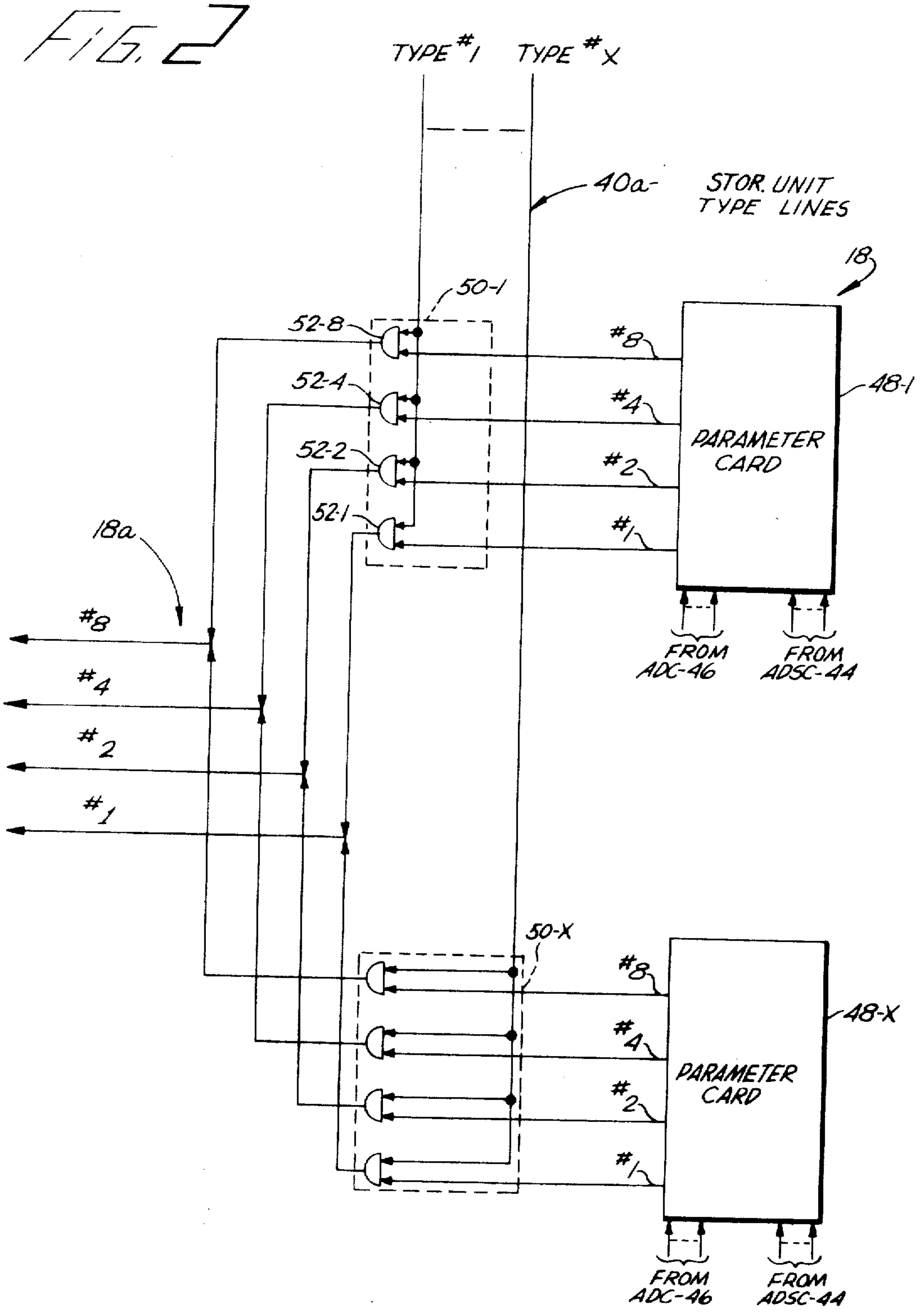
FIG. 2 is a block and schematic diagram showing the details of the parameter generator of FIG. 1.

Consider now the details of the parameter generator 18 shown in FIG. 2. The parameter generator 18 has a parameter card 48 for each different set of parameter types or each different disc file format. In other words, referring to FIG. 4, one disc file subsystem may have the set of parameters shown in Table I whereas another subsystem may have a different set of parameters. By way of example, the number of segments in each of the zones may be different in one disc file subsystem than in another. FIG. 2 shows 48–1 through 48–X parameter cards where X could be any number.

Refer now to the parameter cards themselves. Each parameter card has an input from the ASC 44 and the ADC 46. The ASC 44 identifies the particular parameter to be generated, whereas the ADC 46 forms a series of signals corresponding to the various digits of the parameter. Referring to Table II, by way of example, the ASC 44 goes through states 2, 3, 4, 5, 6 and 7 corresponding to the parameters shown in Table 1. State 0 is the initial condition and state 1 can be considered as not being used for purposes of this invention. Corresponding to each state of the ASC 44, the ADC 46 counts through states 0 through 5 corresponding to the six digits of the address contained in the register 14 and the six digits of the parameter to be generated. Thus, referring to Table II, when the ASC 44 is in state 2 and the ADC 46 counts through states 0 through 5, the binary coded decimal digits 002111 are read out by the corresponding parameter card. Referring to Table I, it will be seen that these are the digits (least significant to most significant) of the number of segments per storage unit.

The parameter cards 48 are pluggable printed circuit cards and each has a logical gating matrix (not shown) which is responsive to the signals from the ADC and ASC for generating output signals on four output lines represented by the symbols #1, #2, #4 and #8. The output signals represent a binary coded decimal digit. Thus, no signal appears on any of the output lines from a parameter card if a binary coded decimal digit 0 is read out. A signal is formed on line #1 if a binary coded decimal digit 1 is read out; a control signal is formed on lines #1 and #2 if a binary coded decimal digit 3 is read out; etc. Gating matrices of the type used on each parameter card 48 are well known in the computer art and a detailed description thereof is not given.

A selection circuit including gating circuits 50–1 through 50–X are provided corresponding to the parameter cards 48–1 through 48–X. Within each gating circuit 50 are four AND gates 52–1 through 52–8 corresponding to the output lines #1 through #8 of the corresponding parameter card 48. Each AND gate has an input connected to the corresponding output line of the corresponding parameter card 48. In addition, each of the AND gates within one gating circuit 50 has a common input connected to one of a plurality of storage unit type lines **40*a* from the control logic 40. The lines in 40*a* are represented by the symbols TYPE #1 through TYPE #X corresponding to the parameter cards 48–1 through 48–X and corresponding to the types of parameter sets #1 through #X in the system. The selection circuit including the gates 50–1 through 50–X gate the output of the corresponding parameter cards 48 to the output lines 18*a* of the parameter generator 18. The particular parameter card 48 whose output is gated to the output circuit 18*a* is determined by the line TYPE #1 through TYPE #X receiving a control signal from the control logic 40. Thus, the control logic 40 contains logical gating to determine the type of parameter needed for the particular subsystem to be addressed and forms a control signal on the corresponding line TYPE #1 through TYPE #X causing the output line #1–#8 of the corresponding parameter card 48 to be gated through the corresponding gate 50 to the output lines 18*a***.

It will be seen that corresponding output lines from each parameter card are gated through the AND gates and connected together at the output circuit **18*a*** to commonly numbered lines #1–#8.

It should be understood that the invention is not limited to serial arithmetic. For example, the adder could be replaced by a subtractor and have an input for each digit of the address to be translated. The parameter cards would be arranged to provide all digits of a parameter in parallel rather than serially. The parameter gate 22 and the parameter generator 18 would not be required and the parameter cards would be coupled directly to the input of the substractor in parallel. No address digit counter would be required and the address sequence counter 44 would be used to select the appropriate parameter on the parameter cards as described hereinabove. The subtractor would perform a parallel substract using the content of the register 14 and the parameter cards to form the difference, and the difference would be stored back into the register 14 in parallel. However, it would not be necesary to over-subtract and add back in, as subtraction for each parameter could be terminated without changing the content of the register 14 at the instant a negative result would be formed. Counters and a register of the type shown at 26–36 would be used to form and store the various parts of the translated address.

It should also be noted that the S.A. register 36 could be time shared with other registers in the system, such as 14, which would have the remainder after the arithmetic operation is complete.

TABLE I

| Description | Value |
|---|---|
| Segs per SU | 111,200 |
| Segs per disc face | 013,900 |
| Segs in 10 tracks in all 3 zones | 002,780 |
| Segs in 1 track in all 3 zones | 000,278 |
| Segs in 1 track in Z1 | 000,078 |
| Segs in 1 track in Z2 | 000,100 |

TABLE II

| ADC | 00 | 01 | 02 | 03 | 04 | 05 |
|---|---|---|---|---|---|---|
| ASC=00 | | | | | | |
| ASC=01 | | | | | | |
| ASC=02 | 0 | 0 | 2 | 1 | 1 | 1 |
| ASC=03 | 0 | 0 | 9 | 3 | 1 | 0 |
| ASC=04 | 0 | 8 | 7 | 2 | 0 | 0 |
| ASC=05 | 8 | 7 | 2 | 0 | 0 | 0 |
| ASC=06 | 8 | 7 | 0 | 0 | 0 | 0 |
| ASC=07 | 0 | 0 | 1 | 0 | 0 | 0 |

Although one example of the present invention has been shown by way of illustration, it should be understood that there are many other rearrangements and embodiments of the present invention within the scope of the following claims.

We claim:

1. A translator of addresses for a rotating record member file, predetermined information formats being assigned for various record members and transducers being used for reading and writing thereon, the translator converting the addresses into a plurality of address parts for transducer selection and for angular position selection of the member and comprising a parameter circuit means for each different information format for which the addresses are to be translated, each parameter circuit means forming coded parameter signals for the corresponding format, at least one parameter signal being formed for each of a plurality of address part means for forming the complement of said parameter signals, combining means receiving an address to be translated for combining same with said parameter signals or said complement of said parameter signals thereby forming a coded result signal thereby causing addition or subtraction, respectively, of the parameter signals, said combining means further combining any results formed thereby with said parameter signals or said complement of parameter signals, means for counting the number of times a parameter complement signal corresponding to a particular address part is combined with the address or result signals before the coded result signals become less than zero, and means including said counting means for forming a signal representing the transducer selection and the angular position parts of the translated address.

2. A translator according to claim 1 comprising at least one counter for each of said plurality of address parts for transducer selection.

3. A translator according to claim 2 including register means for storing the coded result signal formed after all said transducer selection address parts are set into said counters thereby, such coded result thereby forming the angular position address part.

4. A translator according to claim 1 comprising controllable gating means for coupling the parameter signals from a selected one of the parameter circuit means, the combining means receiving such selected parameter signals or the complement thereof for combining.

5. A translator according to claim 4 wherein said controllable gating means comprise a gating circuit for each parameter circuit means having an individual control circuit, a control signal on a control circuit causing the corresponding gating circuit to couple the output signals of the corresponding parameter circuit means to an output circuit of such parameter circuit means.

6. A translator according to claim 5 wherein said combining means comprises an adder circuit including an output circuit for indicating when a carryout is produced, and including control circuit means causing the complement of a parameter signal to be applied to the adder by the complement means in response to a carryout signal and coupling means for coupling the uncomplemented signals from the controllable gating means to the adder, said control circuit means causing the coupling means to couple the uncomplemented parameter signal to the adder circuit in response to the lack of a carryout signal.

7. A translator according to claim 1 including parameter counting means having a count corresponding to each of said parameters, the parameter circuit means responding to the corresponding parameter count for forming the parameter signals of such parameter circuit means.

8. A translator according to claim 7 wherein the address to be translated and the coded parameter signals each contain a plurality of digits, and including a digit counting means for providing a plurality of counts corresponding to the digits of the parameter signals, the parameter circuit means being responsive to the count of said digit counting means for reading out the corresponding digit of the coded parameter signal designated by the state of said parameter counting means.

9. A translator of addresses for a rotating record member file, predetermined information formats being assigned for various record members and transducers being used for reading and writing thereon, the translator converting the addresses into a plurality of address parts for transducer selection and for angular position selection of the member and comprising means for selectively forming signals representing the complement of a parameter for each different information format, the signals including a parameter complement signal part for each of a plurality of address parts, means for combining an address to be translated with the parameter complement signals and for forming a result, the result and each subsequent result being coupled back to the input of the combining means for further combining, said first named means being operative for repeatedly applying the coded parameter complement signal for each parameter part to the combining means causing each parameter to be repeatedly subtracted from the address and subsequent results and a counter for each of said plurality of parameter complement parts, said counters counting the number of times the complement of the corresponding parameter part is combined before the result becomes negative, the states of said counters thereby representing the address parts corresponding to the counter.

10. A translator according to claim 9 including a register for storing the result remaining after the last parameter complement signal has been combined the stored result thereby identifying an address part.

11. A translator of addresses for a rotating record member file, predetermined information formats being assigned for various record members and transducers being used for reading and writing thereon, the translator converting the addresses into a plurality of address parts for transducer selection and for angular position selection of the member and comprising parameter circuit means for each different information format for which the addresses are to be translated, each parameter circuit means forming coded parameter signals for the corresponding format, at least one parameter signal being formed for each of a plurality of said address parts, combining means for combining input signals thereto thereby providing a result signal, means for selectively applying one of said parameter signals or the complement of the parameter signals to said combining means causing addition or subtraction thereof, respectively, means for applying an address to be translated to said combining means with a parameter or a parameter complement signal, means for applying the result signals formed by the combining means back to the input of the combining means together with a parameter or a parameter complement signal, means for counting the number of times each of said plurality of parameter complement signals from a particular parameter circuit means is combined with the address or result signals before the coded result signals become less than zero, and means including said counting means for forming a signal representing the transducer selection and the angular position parts of the translated address.

12. A translator of addresses for a rotating record member file, predetermined information formats being assigned for various record members and transducers being used for reading and writing thereon, the translator converting the addresses into a plurality of address parts for transducer selection and for angular position selection of the member and comprising a parameter circuit means for each different information format for which the addresses are to be translated, each parameter circuit means forming coded parameter signals for the corresponding format, at least one parameter signal being formed for each of a plurality of said address parts, combining means for receiving an address to be translated and coupled to said parameter signals for forming a coded result signal corresponding to the difference between the parameter signals and the received address, said combining means further subtracting said parameter signals from any results which are formed thereby, means for counting the number of times a parameter signal corresponding to a particular address part is subtracted from the address or result signals before the coded result signals become less than zero, and means including said counting means for forming a signal representing the transducer selection and the angular position parts of the translated address.

13. A translator for addresses to be translated into a plurality of address parts for read/write head selection and angular position selection in a file having a rotating member comprising register means for storing an address to be translated, a plurality of parameter circuit means each for producing a series of coded signals at least one signal corresponding to the complement of each of a plurality of address parts, selection means for selecting the signals from said parameter circuit means, means for combining a selected parameter complement signal with the content of said register means causing subtraction of the parameter from the content of said register means, and means including a counter for each of said plurality of address parts for counting the number of times the corresponding coded parameter signal is combined with the content of the register means before the result becomes less than zero, the content of the counters thereby representing the corresponding address parts.

14. A translator of addresses for a rotating record member file, predetermined information formats being assigned for various record members and transducers being used for reading and writing thereon, the translator converting the addresses into a plurality of address parts for transducer selection and for angular position selection of the member and comprising means for selectively forming signals representing a parameter for each different information format, the signals including a parameter complement signal part for each of a plurality of address parts, means for combining an address to be translated with the parameter signals and for forming a result corresponding to the difference therebetween, the result and each subsequent result being coupled back to the input of the combining means for further combining, said first named means being operative for repeatedly forming the coded parameter signal for each parameter part for the combining means causing each parameter to be repeatedly subtracted from the address and subsequent results and a counter for each of said plurality of parameter complement parts, said counters counting the number of times the corresponding parameter part is subtracted before the result becomes negative, the states of said counters thereby representing the address parts corresponding to the counter.

References Cited

UNITED STATES PATENTS

| | | |
|---|---|---|
| 3,015,441 | 1/1962 | Rent et al. |
| 3,239,816 | 3/1966 | Breslin et al. |
| 3,299,261 | 1/1967 | Steigerwalt, Jr. |
| 3,315,233 | 4/1967 | De Campo et al. |

PAUL J. HENON, Primary Examiner

H. E. SPRINGBORN, Assistant Examiner